United States Patent
Zhao et al.

(10) Patent No.: US 11,172,443 B2
(45) Date of Patent: Nov. 9, 2021

(54) HYBRID AUTOMATIC REPEAT REQUEST HARQ TRANSMISSION METHOD AND RELATED DEVICE

(71) Applicant: CHINA ACADEMY OF TELECOMMUNICATIONS TECHNOLOGY, Beijing (CN)

(72) Inventors: Yali Zhao, Beijing (CN); Fangli Xu, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/476,105

(22) PCT Filed: Feb. 5, 2018

(86) PCT No.: PCT/CN2018/075305
§ 371 (c)(1),
(2) Date: Jul. 4, 2019

(87) PCT Pub. No.: WO2018/127218
PCT Pub. Date: Jul. 12, 2018

(65) Prior Publication Data
US 2019/0357141 A1    Nov. 21, 2019

(30) Foreign Application Priority Data
Jan. 4, 2017   (CN) .................. 201710005602.X

(51) Int. Cl.
*H04W 52/02*    (2009.01)
*H04L 1/18*    (2006.01)
(Continued)

(52) U.S. Cl.
CPC ....... *H04W 52/0216* (2013.01); *H04L 1/1812* (2013.01); *H04L 1/1887* (2013.01); *H04L 5/0032* (2013.01); *H04W 72/04* (2013.01)

(58) Field of Classification Search
CPC ...... H04W 72/04; H04W 72/12; H04W 92/18
See application file for complete search history.

(56) References Cited

U.S. PATENT DOCUMENTS 8,553,718 B2    10/2013  Nagaraja
10,383,139 B2 *   8/2019  Ma .................... H04W 72/1278
(Continued)

FOREIGN PATENT DOCUMENTS

CN    101414900 A    4/2009
CN    101946446 A    1/2011
(Continued)

OTHER PUBLICATIONS

"Discussion on HARQ procedure in NR", 3GPP TSG-RAN WG2 Meeting #96, R2-167590, Reno, NV, Nov. 14-18, 2016, Huawei, HiSilicon, 3 pages.
(Continued)

*Primary Examiner* — Raj Jain
(74) *Attorney, Agent, or Firm* — Kilpatrick Townsend & Stockton LLP

(57) ABSTRACT

Disclosed in the present application are a hybrid automatic repeat request HARQ transmission method and a related device, for solving the technical problem that there not yet exists an HARQ transmission scheme for the 5G system in the prior art due to the fact that the 5G system supports multi-numerology and/or multi-TTI. The method comprises: a terminal maintains an HARQ entity on the basis of a cell, the HARQ entity supporting multiple parallel HARQ processes; the terminal receives a scheduling signaling sent by the network side device; and the terminal determines,
(Continued)

---

201 — A network-side device maintains an HARQ entity for each aggregated cell of a UE, where the HARQ entity supports multiple concurrent HARQ processes 202 — The network-side device transmits scheduling signaling to the UE so that the UE determines an HARQ process number of the HARQ entity related to the scheduling signaling, and a baseband parameter and/or a transmission time interval corresponding to the HARQ process number according to the scheduling signaling according to the scheduling signaling, an HARQ process number of the HARQ entity against which the scheduling signaling is directed and a baseband parameter and/or transmission time interval corresponding to the HARQ process number.

22 Claims, 3 Drawing Sheets

(51) Int. Cl.
  *H04L 5/00* (2006.01)
  *H04W 72/04* (2009.01)

(56) References Cited

U.S. PATENT DOCUMENTS

| | | | |
|---|---|---|---|
| 2013/0250924 A1* | 9/2013 | Chen | H04L 1/1819 370/336 |
| 2014/0362832 A1* | 12/2014 | Rudolf | H04L 1/1822 370/336 |
| 2016/0183276 A1* | 6/2016 | Marinier | H04W 72/12 370/329 |
| 2016/0234800 A1 | 8/2016 | Jung et al. | |

FOREIGN PATENT DOCUMENTS

| | | |
|---|---|---|
| CN | 102394728 A | 3/2012 |
| CN | 103313270 A | 9/2013 |
| CN | 103391175 A | 11/2013 |
| CN | 104539390 A | 4/2015 |
| CN | 105429738 A | 3/2016 |

OTHER PUBLICATIONS

Ericsson: "Modelling of MAC-PHY interface", 3GPP TSG-RAN WG2 #96, R2-1688660, Reno, Neveda, USA, Nov. 14-18, 2016.

\* cited by examiner

HYBRID AUTOMATIC REPEAT REQUEST HARQ TRANSMISSION METHOD AND RELATED DEVICE

This application is a National Stage of International Application No. PCT/CN2018/075305, filed Feb. 5, 2018, which claims the benefit of Chinese Patent Application No. 201710005602.X, filed with the Chinese Patent Office on Jan. 4, 2017, and entitled "A method and device for transmitting a Hybrid Automatic Repeat Request (HARQ)", both of which are hereby incorporated by reference in their entireties.

FIELD

The present invention relates to the field of communications, and particularly to a method and device for transmitting a Hybrid Automatic Repeat Request (HARQ).

BACKGROUND

1. Introduction to a Numerology.

The numerology is a term at the $3^{rd}$ Generation Partnership Project (3GPP) wireless physical layer. Different numerologies support different sub-carrier spacings.

2. Introduction to a Transmission Time Interval (TTI).

The length of a TTI is 1 ms in a legacy Long Term Evolution (LTE) system. In order to support a shorter delay, different TTI lengths, e.g., one Orthogonal Frequency Division Multiplexing (OFDM) symbol, are introduced to the LTE R14 and later releases.

At present, in the LTE system, one hand, a terminal supports only one numerology in either a uni-cell operating mode or a Carrier Aggregation (CA) operating mode; and on the other hand, the LTE system supports a variable TTI length, but the TTI varies semi-statically, that is, the TTI length in use is fixed in a period of time.

Accordingly in a solution to HARQ transmission in the LTE system, there are the same numerology and TTI corresponding to an HARQ entity in the uni-cell operating mode, and there are also the same numerology and TTI corresponding to an HARQ entity in each cell for CA in the CA operating mode. Unlike the LTE system, a 5G system is a system in which multiple numerologies and/or TTIs coexist, but there has been absent so far in the prior art a solution to HARQ transmission in the system in which multiple numerologies and/or TTIs coexist.

SUMMARY

Embodiments of the invention provide a method and device for transmitting a Hybrid Automatic Repeat Request (HARQ) so as to address the problem in the prior art that there has been absent so far a solution to HARQ transmission in the 5G system supporting multiple numerologies and/or TTIs.

Particular technical solutions according to the embodiments of the invention are as follows.

In a first aspect, an embodiment of the invention provides a method for transmitting a Hybrid Automatic Repeat Request (HARQ), the method including:

maintaining, by a terminal, an HARQ entity on the basis of cell, wherein the HARQ entity supports multiple concurrent HARQ processes;

receiving, by the terminal, scheduling signaling transmitted by a network-side device; and determining, by the terminal, an HARQ process number of the HARQ entity related to the scheduling signaling, and a baseband parameter and/or a transmission time interval corresponding to the HARQ process number according to the scheduling signaling.

In a possible implementation, receiving, by the terminal, the scheduling signaling transmitted by the network-side device includes:

receiving, by the terminal, initial transmission scheduling signaling transmitted by the network-side device; and determining, by the terminal, the HARQ process number of the HARQ entity related to the scheduling signaling, and the baseband parameter and/or the transmission time interval corresponding to the HARQ process number according to the scheduling signaling includes:

determining, by the terminal, an HARQ process number of the HARQ entity related to the initial transmission scheduling signaling, and a first baseband parameter and/or a first transmission time interval corresponding to the HARQ process number according to the initial transmission scheduling signaling.

In a possible implementation, determining, by the terminal, the HARQ process number of the HARQ entity related to the initial transmission scheduling signaling, and the first baseband parameter and/or the first transmission time interval corresponding to the HARQ process number according to the initial transmission scheduling signaling includes:

determining, by the terminal, the first baseband parameter and/or the first transmission time interval according to a first baseband parameter and/or a first transmission time interval corresponding to an HARQ process number carried in the initial transmission scheduling signaling; or determining, by the terminal, the first transmission time interval according to a first transmission time interval corresponding to an HARQ process number carried in the initial transmission scheduling signaling, and to determine the first baseband parameter according to resource indication information carried in the initial transmission scheduling signaling, and resource-baseband parameter mapping information.

In a possible implementation, receiving, by the terminal, the scheduling signaling transmitted by the network-side device includes:

receiving, by the terminal, retransmission scheduling signaling transmitted by the network-side device; and determining, by the terminal, the HARQ process number of the HARQ entity related to the scheduling signaling, and the baseband parameter and/or the transmission time interval corresponding to the HARQ process number according to the scheduling signaling includes:

determining, by the terminal, an HARQ process number of the HARQ entity related to the initial transmission scheduling signaling, and a second baseband parameter and/or a second transmission time interval corresponding to the HARQ process number according to the retransmission scheduling signaling.

In a possible implementation, determining, by the terminal, the HARQ process number of the HARQ entity related to the retransmission scheduling signaling, and the second baseband parameter and/or a second transmission time interval corresponding to the HARQ process number according to the retransmission scheduling signaling includes:

determining, by the terminal, an HARQ process number according to the retransmission scheduling signaling, wherein the second baseband parameter and/or the second transmission time interval is/are equal to the first baseband parameter and/or the second transmission time interval for the HARQ process number during initial transmission; or determining, by the terminal, the second baseband parameter and/or the second transmission time interval according to a second baseband parameter and/or a second transmission time interval corresponding to an HARQ process number carried in the retransmission scheduling signaling; or determining, by the terminal, the second transmission time interval according to a second transmission time interval corresponding to an HARQ process number carried in the retransmission scheduling signaling, and to determine the second baseband parameter according to resource indication information carried in the retransmission scheduling signaling, and resource-baseband parameter mapping information.

In a possible implementation, the method further includes:

receiving, by the terminal, HARQ configuration information, transmitted by the network-side device, corresponding to the terminal;

wherein the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, the HARQ configuration information includes a set of parameters configured by the network-side device on the basis of each terminal; or the HARQ configuration information includes a set of parameters configured by the network-side device on the basis of each baseband parameter and/or transmission time interval.

In a possible implementation, if there are different baseband parameters and/or transmission time intervals for initial transmission and retransmission:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a possible implementation, if there are different baseband parameters and/or transmission time intervals for initial transmission and retransmission, determining, by the network-side device based on a protocol agreement or a network-side configuration whether the maximum number of times that an uplink and/or downlink HARQ is transmitted is determined according to a first baseband parameter and/or a first transmission time interval corresponding to the initial transmission, or according to a second baseband parameter and/or a second transmission time interval corresponding to the retransmission.

In a second aspect, an embodiment of the invention provides a method for transmitting a Hybrid Automatic Repeat Request (HARQ), the method including:

maintaining, by a network-side device, an HARQ entity on the basis of each aggregated cell of a terminal, wherein the HARQ entity supports multiple concurrent HARQ processes; and transmitting, by the network-side device, scheduling signaling to the terminal so that the terminal determines an HARQ process number of the HARQ entity related to the scheduling signaling, and a baseband parameter and/or a transmission time interval corresponding to the HARQ process number according to the scheduling signaling.

In a possible implementation, the method further includes:

determining, by the network-side device, HARQ configuration information corresponding to the terminal; and transmitting, by the network-side device, the HARQ configuration information to the terminal.

In a possible implementation, the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, determining, by the network-side device, the HARQ configuration information corresponding to the terminal includes:

configuring, by the network-side device, each aggregated cell with a set of HARQ configuration information; or configuring, by the network-side device, a set of HARQ configuration information on the basis of each baseband parameter and/or transmission time interval.

In a possible implementation, configuring, by the network-side device, a set of HARQ configuration information for each baseband parameter and/or transmission time interval includes:

if there are different baseband parameters and/or transmission time intervals for initial transmission and retransmission, determining, by the network-side device, the maximum number of times that an uplink and/or downlink HARQ is transmitted, according to a first baseband parameter and/or a first transmission time interval corresponding to the initial transmission; or determining, by the network-side device, the maximum number of times that an uplink and/or downlink HARQ is transmitted, according to a second baseband parameter and/or a second transmission time interval corresponding to the retransmission.

In a possible implementation, if there are different baseband parameters and/or transmission time intervals for initial transmission and retransmission, configuring, by the network-side device, a set of HARQ configuration information on the basis of each baseband parameter and/or transmission time interval includes:

obtaining, by the network-side device, a protocol agreement or a network-side configuration; and determining, by the network-side device, according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a possible implementation, transmitting, by the network-side device, the scheduling signaling to the terminal includes:

transmitting, by the network-side device, initial transmission scheduling signaling to the terminal;

wherein the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a possible implementation, transmitting, by the network-side device, the scheduling signaling to the terminal includes:

transmitting, by the network-side device, retransmission scheduling signaling to the terminal;

wherein the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In a possible implementation, the method further includes:

transmitting, by the network-side device, to resource-baseband parameter mapping information to the terminal so that the terminal determines the second baseband parameter according to the resource indication information and the resource-baseband parameter mapping information.

In a third aspect, an embodiment of the invention provides a terminal including:

a first maintaining module configured to maintain an HARQ entity on the basis of cell, wherein the HARQ entity supports multiple concurrent HARQ processes;

a first receiving module configured to receive scheduling signaling transmitted by a network-side device; and a first determining module configured to determine an HARQ process number of the HARQ entity related to the scheduling signaling, and a baseband parameter and/or a transmission time interval corresponding to the HARQ process number according to the scheduling signaling.

In a possible implementation, the first receiving module is configured:

to receive initial transmission scheduling signaling transmitted by the network-side device; and the first determining module is configured:

to determine an HARQ process number of the HARQ entity related to the initial transmission scheduling signaling, and a first baseband parameter and/or a first transmission time interval corresponding to the HARQ process number according to the initial transmission scheduling signaling.

In a possible implementation, the first determining module is configured:

to determine the first baseband parameter and/or the first transmission time interval according to a first baseband parameter and/or a first transmission time interval corresponding to an HARQ process number carried in the initial transmission scheduling signaling; or to determine the first transmission time interval according to a first transmission time interval corresponding to an HARQ process number carried in the initial transmission scheduling signaling, and to determine the first baseband parameter according to resource indication information carried in the initial transmission scheduling signaling, and resource-baseband parameter mapping information.

In a possible implementation, the first receiving module is configured:

to receive retransmission scheduling signaling transmitted by the network-side device; and the first determining module is configured:

to determine an HARQ process number of the HARQ entity related to the retransmission scheduling signaling, and a second baseband parameter and/or a second transmission time interval corresponding to the HARQ process number according to the retransmission scheduling signaling.

In a possible implementation, the first determining module is configured:

to determine an HARQ process number according to the retransmission scheduling signaling, wherein the second baseband parameter and/or the second transmission time interval is or are equal to the first baseband parameter and/or the second transmission time interval for the HARQ process number during initial transmission; or to determine the second baseband parameter and/or the second transmission time interval according to a second baseband parameter and/or a second transmission time interval corresponding to an HARQ process number carried in the retransmission scheduling signaling; or to determine the second transmission time interval according to a second transmission time interval corresponding to an HARQ process number carried in the retransmission scheduling signaling, and to determine the second baseband parameter according to resource indication information carried in the retransmission scheduling signaling, and resource-baseband parameter mapping information.

In a possible implementation, the terminal further includes:

a second receiving module configured to receive HARQ configuration information, transmitted by the network-side device, corresponding to the terminal;

wherein the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, the HARQ configuration information includes a set of parameters configured by the network-side device on the basis of each terminal; or the HARQ configuration information includes a set of parameters configured by the network-side device on the basis of each baseband parameter and/or transmission time interval.

In a possible implementation, if there are different baseband parameters and/or transmission time intervals for initial transmission and retransmission:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a possible implementation, if there are different baseband parameters and/or transmission time intervals for initial transmission and retransmission, according to a protocol agreement or a network-side configuration, the maximum number of times that an uplink and/or downlink HARQ is transmitted is determined according to a first baseband parameter and/or a first transmission time interval corresponding to the initial transmission, or according to a second baseband parameter and/or a second transmission time interval corresponding to the retransmission.

In a fourth aspect, an embodiment of the invention provides a network-side device including:

a first maintaining module configured to maintain an HARQ entity on the basis of each aggregated cell of a terminal, wherein the HARQ entity supports multiple concurrent HARQ processes; and a first transmitting module configured to transmit scheduling signaling to the terminal so that the terminal determines an HARQ process number of the HARQ entity related to the scheduling signaling, and a baseband parameter and/or a transmission time interval corresponding to the HARQ process number according to the scheduling signaling.

In a possible implementation, the network-side device further includes:

a first determining module is configured to determine HARQ configuration information corresponding to the terminal; and a second transmitting module is configured to transmit the HARQ configuration information to the terminal.

In a possible implementation, the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, the first determining module is configured:

to configure each aggregated cell with a set of HARQ configuration information; or to configure a set of HARQ configuration information on the basis of each baseband parameter and/or transmission time interval.

In a possible implementation, the first determining module is configured:

if there are different baseband parameters and/or transmission time intervals for initial transmission and retransmission, to determine the maximum number of times that an uplink and/or downlink HARQ is transmitted, according to a first baseband parameter and/or a first transmission time interval corresponding to the initial transmission; or to determine the maximum number of times that an uplink and/or downlink HARQ is transmitted, according to a second baseband parameter and/or a second transmission time interval corresponding to the retransmission.

In a possible implementation, if there are different baseband parameters and/or transmission time intervals for initial transmission and retransmission, then the first determining module is configured:

to obtain a protocol agreement or a network-side configuration; and to determine according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a possible implementation, the first transmitting module is configured:

to transmit initial transmission scheduling signaling to the terminal;

wherein the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a possible implementation, the first transmitting module is configured:

to transmit retransmission scheduling signaling to the terminal;

wherein the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In a possible implementation, the network-side device further includes:

a third transmitting module is configured to transmit resource-baseband parameter mapping information to the terminal so that the terminal determines the second baseband parameter according to the resource indication information and the resource-baseband parameter mapping information.

In a fifth aspect, an embodiment of the invention provides a terminal including: a processor, a memory, and a transceiver, wherein:

the transceiver transmits and receive data under the control of the processor, the memory stores preset program, and the processor reads and executes the program in the memory:

to maintain an HARQ entity on the basis of cell, wherein the HARQ entity supports multiple concurrent HARQ processes;

to receive scheduling signaling transmitted by a network-side device through the transceiver; and to determine an HARQ process number of the HARQ entity related to the scheduling signaling, and a baseband parameter and/or a transmission time interval corresponding to the HARQ process number according to the scheduling signaling.

In a possible implementation, the processor is configured to read and execute the program in the memory:

to receive initial transmission scheduling signaling transmitted by the network-side device through the transceiver; and to determine an HARQ process number of the HARQ entity related to the initial transmission scheduling signaling, and a first baseband parameter and/or a first transmission time interval corresponding to the HARQ process number according to the initial transmission scheduling signaling.

In a possible implementation, the processor is configured to read and execute the program in the memory:

to determine the first baseband parameter and/or the first transmission time interval according to a first baseband parameter and/or a first transmission time interval corresponding to an HARQ process number carried in the initial transmission scheduling signaling; or to determine the first transmission time interval according to a first transmission time interval corresponding to an HARQ process number carried in the initial transmission scheduling signaling, and to determine the first baseband parameter according to resource indication information carried in the initial transmission scheduling signaling, and resource-baseband parameter mapping information.

In a possible implementation, the processor is configured to read and execute the program in the memory:

to instruct the transceiver to receive retransmission scheduling signaling transmitted by the network-side device; and to determine an HARQ process number of the HARQ entity related to the retransmission scheduling signaling, and a second baseband parameter and/or a second transmission time interval corresponding to the HARQ process number according to the retransmission scheduling signaling.

In a possible implementation, the processor is configured to read and execute the program in the memory:

to determine an HARQ process number according to the retransmission scheduling signaling, wherein the second baseband parameter and/or the second transmission time interval is or are equal to the first baseband parameter and/or the second transmission time interval for the HARQ process number during initial transmission; or to determine the second baseband parameter and/or the second transmission time interval according to a second baseband parameter and/or a second transmission time interval corresponding to an HARQ process number carried in the retransmission scheduling signaling; or to determine the second transmission time interval according to a second transmission time interval corresponding to an HARQ process number carried in the retransmission scheduling signaling, and to determine the second baseband parameter according to resource indication information carried in the retransmission scheduling signaling, and resource-baseband parameter mapping information.

In a possible implementation, the processor is configured to read and execute the program in the memory:

to instruct the transceiver to receive HARQ configuration information, transmitted by the network-side device, corresponding to the terminal;

wherein the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, the HARQ configuration information includes a set of parameters configured by the network-side device on the basis of each terminal; or the HARQ configuration information includes a set of parameters configured by the network-side device on the basis of each baseband parameter and/or transmission time interval.

In a possible implementation, if there are different baseband parameters and/or transmission time intervals for initial transmission and retransmission:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a possible implementation, if there are different baseband parameters and/or transmission time intervals for initial transmission and retransmission, according to a protocol agreement or a network-side configuration, the maximum number of times that an uplink and/or downlink HARQ is transmitted is determined according to a first baseband parameter and/or a first transmission time interval corresponding to the initial transmission, or a second baseband parameter and/or according to a second transmission time interval corresponding to the retransmission.

In a sixth aspect, an embodiment of the invention provides a network-side device including: a processor, a memory, and a transceiver, wherein:

the transceiver transmits and receive data under the control of the processor, the memory stores preset program, and the processor reads and executes the program in the memory:

to maintain an HARQ entity on the basis of each aggregated cell of a terminal, wherein the HARQ entity supports multiple concurrent HARQ processes; and to transmit scheduling signaling to the terminal through the transceiver so that the terminal determines an HARQ process number of the HARQ entity related to the scheduling signaling, and a baseband parameter and/or a transmission time interval corresponding to the HARQ process number according to the scheduling signaling.

In a possible implementation, the processor is further configured to read and execute the program in the memory:

to determine HARQ configuration information corresponding to the terminal; and to instruct the transceiver to transmit the HARQ configuration information to the terminal.

In a possible implementation, the HARQ configuration information includes at least one of followings:

a maximum number of times that an uplink or downlink HARQ is transmitted;

a scheduling timing relationship;

an HARQ timing relationship; or

Discrete Reception (DRX) timer related configuration information.

In a possible implementation, the processor is configured to read and execute the program in the memory:

to configure each aggregated cell with a set of HARQ configuration information; or to configure a set of HARQ configuration information on the basis of each baseband parameter and/or transmission time interval.

In a possible implementation, the processor is configured to read and execute the program in the memory:

if there are different baseband parameters and/or transmission time intervals for initial transmission and retransmission, to determine the maximum number of times that an uplink and/or downlink HARQ is transmitted, according to a first baseband parameter and/or a first transmission time interval corresponding to the initial transmission; or to determine the maximum number of times that an uplink and/or downlink HARQ is transmitted, according to a second baseband parameter and/or a second transmission time interval corresponding to the retransmission.

In a possible implementation, if there are different baseband parameters and/or transmission time intervals for initial transmission and retransmission, the processor is configured to read and execute the program in the memory:

to obtain a protocol agreement or a network-side configuration; and to determine according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a possible implementation, the processor is configured to read and execute the program in the memory:

to instruct the transceiver to transmit initial transmission scheduling signaling to the terminal;

wherein the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a possible implementation, the processor is configured to read and execute the program in the memory:

to instruct the transceiver to transmit retransmission scheduling signaling to the terminal;

wherein the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In a possible implementation, the processor is further configured to read and execute the program in the memory:

to instruct the transceiver to transmit resource-baseband parameter mapping information to the terminal so that the terminal determines the second baseband parameter according to the resource indication information and the resource-baseband parameter mapping information.

In a seventh aspect, an embodiment of the invention provides a computer readable storage medium including program codes configured, upon being executed on a computing device to cause the computing device to perform the method according to any one of the solutions in the first aspect above.

In an eighth aspect, an embodiment of the invention provides a computer readable storage medium including program codes configured, upon being executed on a computing device to cause the computing device to perform the method according to any one of the solutions in the second aspect above.

With the technical solutions above according to the embodiments of the invention, a terminal maintains an HARQ entity on the basis of cell, where the HARQ entity supports multiple concurrent HARQ processes; the terminal receives scheduling signaling transmitted by a network-side device; and the terminal determines an HARQ process number of the HARQ entity related to the scheduling signaling, and a baseband parameter and/or a transmission time interval corresponding to the HARQ process number according to the scheduling signaling. In this way, there is provided a solution to HARQ transmission in a multi-numerology and/or -TTI system.

DETAILED DESCRIPTION OF THE EMBODIMENTS

In order to make the objects, technical solutions, and advantages of the invention more apparent, the invention will be described below in further details with reference to the drawings. Apparently the embodiments to be described are only a part but all of the embodiments of the invention. Based upon the embodiments here of the invention, all of other embodiments which can occur to those ordinarily skilled in the art without any inventive effort shall come into the scope of the invention as claimed.

The numerology and the TTI have been introduced in the Background section of the specification, and a solution to HARQ transmission in an LTE system will be introduced below in brief 1. Uni-Cell Operating Mode.

An asynchronous HARQ is supported in the downlink, a cell maintains an HARQ entity, and an HARQ entity maintains a group of concurrent downlink HARQ processes. Each HARQ process corresponds to a process number. Scheduling at the physical layer is performed on the basis of HARQ process, and an HARQ process number is carried in physical-layer downlink scheduling signaling.

A synchronous HARQ is supported in the uplink. A cell maintains an HARQ entity, and an HARQ entity maintains a group of concurrent uplink HARQ processes. Each HARQ process corresponds to an HARQ process number. Scheduling at the physical is also performed on the basis of HARQ process, but since there is a synchronous HARQ in the uplink in the LTE system, no HARQ process ID is carried in physical-layer uplink scheduling signaling.

There is only one Radio Resource Control (RRC)-layer configuration parameter related to an HARQ in the LTE system, i.e., maxHARQ-Tx, which represents the maximum number of times when an uplink HARQ is transmitted.

2. CA.

Physical resources of multiple cells can be aggregated for a terminal to transmit data and/or control information. In the CA system, a method for transmitting an HARQ in each cell for CA is the same as the method above for transmitting an HARQ in a cell. There are the same numerology and TTI corresponding to an HARQ entity.

Accordingly as can be apparent from the solution above to HARQ transmission in the LTE system, there are the same numerology and TTI corresponding to an HARQ entity in the LTE system, and there is only one configuration parameter maxHARQ-Tx. However the solution to HARQ transmission in the LTE system may not be applicable to a 5G system supporting multiple numerologies and/or TTIs, and in order to address this drawback, the embodiments of the invention provide a method for transmitting a Hybrid Automatic Repeat Request (HARQ).

Figure 1:
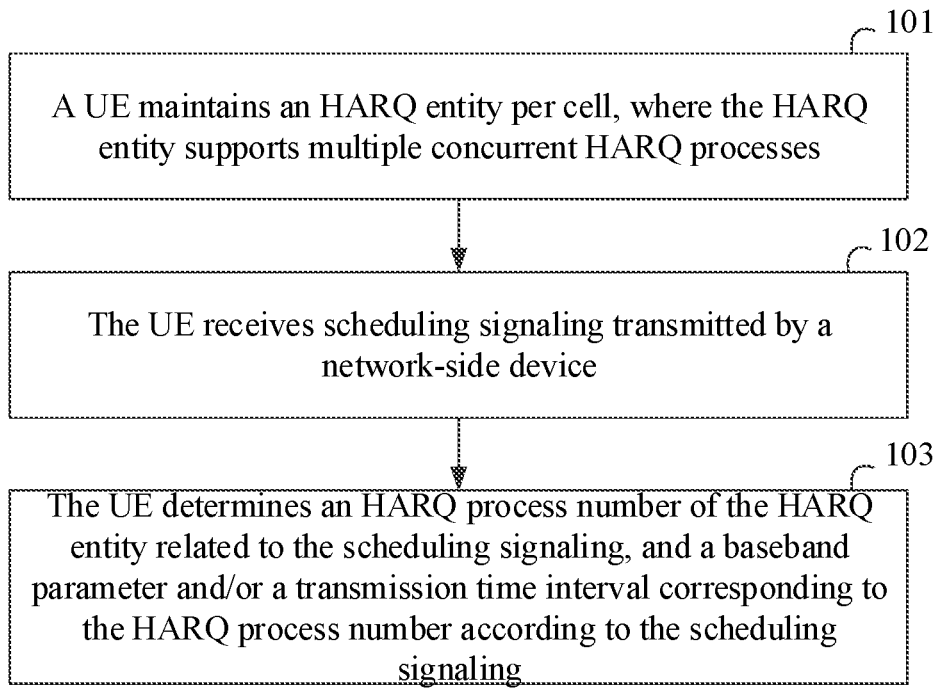
FIG. 1 is a schematic flow chart of a method for transmitting a Hybrid Automatic Repeat Request (HARQ) according to an embodiment of the invention.

As illustrated in FIG. 1, a method for transmitting a Hybrid Automatic Repeat Request (HARQ) according to an embodiment of the invention includes the following steps:

in the step 101, a terminal maintains an HARQ entity on the basis of cell, where the HARQ entity supports multiple concurrent HARQ processes;

in the step 102, the terminal receives scheduling signaling transmitted by a network-side device; and in the step 103, the terminal determines an HARQ process number of the HARQ entity related to the scheduling signaling, and a baseband parameter and/or a transmission time interval corresponding to the HARQ process number according to the scheduling signaling.

The method for transmitting a Hybrid Automatic Repeat Request (HARQ) according to the embodiment of the invention can be either a method for transmitting an HARQ, or a method for transmitting a downlink HARQ, although the embodiment of the invention will not be limited thereto. In the following description, an uplink HARQ will be transmitted, for example.

In the embodiment of the invention, the step 101 is firstly performed so that the terminal maintains an HARQ entity on the basis of cell, where the HARQ entity supports multiple concurrent HARQ processes.

In a particular implementation, the terminal maintains an HARQ entity on the basis of cell, where the HARQ entity supports multiple concurrent HARQ processes, there may or may not be the same baseband parameter and/or TTI corresponding to each of the multiple concurrent HARQ processes, and there may or may not be the same baseband parameter and/or TTI corresponding to initial transmission and retransmission of the same HARQ process.

In the embodiment of the invention, before the terminal receives the scheduling signaling transmitted by the network-side device, the method further includes:

the terminal receives HARQ configuration information, transmitted by the network-side device, corresponding to the terminal;

where the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

Furthermore, in the embodiment of the invention, the HARQ configuration information includes a set of parameters configured by the network-side device for each terminal; or the HARQ configuration information includes a set of parameters configured by the network-side device for each baseband parameter and/or transmission time interval.

In the embodiment of the invention, the maximum number of times that an uplink or downlink HARQ is transmitted represents the maximum number of times that data corresponding to the HARQ process are transmitted, and retransmission of the data is aborted after the maximum number of times that an uplink or downlink HARQ is transmitted is exceeded.

In the embodiment of the invention, the scheduling timing relationship includes an interval of time between a reception instance of time of the scheduling signaling transmitted by the network-side device, and a transmission instance of time of corresponding data.

The HARQ timing relationship includes an interval of time between the data transmission time, and HARQ feedback corresponding to the data.

The Discrete Reception (DRX) timer related configuration information includes but will not be limited to an HARQ Round Trip Time (RTT) timer, a drx-inactivity timer, and a drx-retransmission timer.

In the embodiment of the invention, when initial transmission scheduling signaling is uplink scheduling signaling, the terminal receives HARQ configuration information, transmitted by the network-side device, including the maximum number of times that an uplink HARQ is transmitted, a scheduling timing relationship, an HARQ timing relationship, and Discrete Reception (DRX) timer related configuration information; and when initial transmission scheduling signaling is downlink scheduling signaling, the terminal receives HARQ configuration information, transmitted by the network-side device, including the maximum number of times that a downlink HARQ is transmitted, a scheduling timing relationship, an HARQ timing relationship, and Discrete Reception (DRX) timer related configuration information.

In the embodiment of the invention, the HARQ configuration information can include a set of parameters configured by the network-side device for each terminal, that is, different baseband parameters and/or TTIs correspond to the same HARQ configuration information.

In the embodiment of the invention, the HARQ configuration information can alternatively include a set of parameters configured by the network-side device for each baseband parameter and/or TTI, and in this implementation, HARQ configuration information corresponding to either initial transmission or retransmission is determined according to the baseband parameter and/or the TTI corresponding to the process, as described below respectively.

In the embodiment of the invention, if there are different baseband parameters and/or transmission time intervals for initial transmission and retransmission:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a particular implementation, if there is the same baseband parameter and/or TTI for initial transmission and retransmission, the maximum number of times that an uplink and/or downlink HARQ is transmitted will be a number of times determined by the network-side device according to a first baseband parameter and/or a first transmission time interval during initial transmission.

If there are different baseband parameter and/or transmission time intervals for initial transmission and retransmission, then the maximum number of times that an uplink and/or downlink HARQ is transmitted will be a number of times determined by the network-side device according to a first baseband parameter and/or a first transmission time interval corresponding to initial transmission, or a number of times determined by the network-side device according to a second baseband parameter and/or a second transmission time interval corresponding to retransmission.

In the embodiment of the invention, if there are different numerologies and/or transmission time intervals for initial transmission and retransmission, the network-side device will determine as agreed on in a protocol or as set by the network side whether the maximum number of times that an uplink and/or downlink HARQ is transmitted is determined according to a first baseband parameter and/or a first transmission time interval corresponding to the initial transmission, or a second baseband parameter and/or a second transmission time interval corresponding to the retransmission.

In a particular implementation, if there are different numerologies and/or transmission time intervals for initial transmission and retransmission, then the network-side device will determine as agreed on in a protocol or as set by the network side whether the maximum number of times that an uplink and/or downlink HARQ is transmitted is determined according to the first baseband parameter and/or the first transmission time interval, or the second baseband parameter and/or the second transmission time interval.

After the HARQ configuration information, transmitted by the network-side device, corresponding to the terminal is received, the step 102 is performed so that the terminal receives the scheduling signaling transmitted by the network-side device.

In the embodiment of the invention, the scheduling signaling transmitted by the network-side device, and received by the terminal can be initial transmission scheduling signaling or retransmission scheduling signaling as described below respectively.

Initial transmission scheduling signaling:

the terminal receives initial transmission scheduling signaling transmitted by the network-side device.

Accordingly the terminal determines the HARQ process number of the HARQ entity related to the scheduling signaling, and the baseband parameter and/or the transmission time interval corresponding to the HARQ process number according to the scheduling signaling as follows:

the terminal determines an HARQ process number of the HARQ entity related to the initial transmission scheduling signaling, and a first baseband parameter and/or a first transmission time interval corresponding to the HARQ process number according to the initial transmission scheduling signaling.

In a particular implementation, the terminal determines an HARQ process number of the HARQ entity related to the initial transmission scheduling signaling, and a first baseband parameter and/or a first transmission time interval corresponding to the HARQ process number according to the initial transmission scheduling signaling transmitted by the network-side device upon reception of the initial transmission scheduling signaling.

Furthermore, in the embodiment of the invention, the terminal determines the first baseband parameter and/or the first transmission time interval according to the initial transmission scheduling signaling particularly in the following two particular implementations:

the terminal determines the first baseband parameter and/or the first transmission time interval according to a first baseband parameter and/or a first transmission time interval corresponding to an HARQ process number carried in the initial transmission scheduling signaling; or the terminal determines the first transmission time interval according to a first transmission time interval corresponding to an HARQ process number carried in the initial transmission scheduling signaling, and determines the first baseband parameter according to resource indication information carried in the initial transmission scheduling signaling, and resource-baseband parameter mapping information.

In a particular implementation, if the initial transmission scheduling signaling carries an HARQ process number, and a first baseband parameter and/or a first transmission time interval corresponding to the HARQ process number, the terminal may determine the first baseband parameter and/or the first transmission time interval corresponding to the HARQ process number according to the first baseband parameter and/or the first transmission time interval corresponding to the HARQ process number.

In the embodiment of the invention, if the initial transmission scheduling signaling carries only a first transmission time interval corresponding to an HARQ process number, the terminal will determine the first transmission time interval according to the first transmission time interval corresponding to the HARQ process number, and then determine the first baseband parameter according to resource indication information carried in the initial transmission scheduling signaling, and resource-baseband parameter mapping information.

Those ordinarily skilled in the art can select one of the two implementations above as needed in reality, although the embodiment of the invention will not be limited thereto.

Retransmission scheduling signaling.

The terminal receives retransmission scheduling signaling transmitted by the network-side device.

Accordingly the terminal determines the HARQ process number of the HARQ entity related to the scheduling signaling, and the baseband parameter and/or the transmission time interval corresponding to the HARQ process number according to the scheduling signaling as follows:

the terminal determines an HARQ process number of the HARQ entity related to the retransmission scheduling signaling, and a second baseband parameter and/or a second transmission time interval corresponding to the HARQ process number according to the retransmission scheduling signaling.

In a particular implementation, the terminal determines an HARQ process number of the HARQ entity related to the retransmission scheduling signaling, and a second baseband parameter and/or a second transmission time interval corresponding to the HARQ process number according to the retransmission scheduling signaling transmitted by the network-side device upon reception of the retransmission scheduling signaling.

Furthermore, in the embodiment of the invention, the terminal determines the second baseband parameter and/or the second transmission time interval corresponding to the HARQ process number in the following three particular implementations as particularly described below respectively:

the terminal determines the HAQR process number according to the retransmission scheduling signaling, where the second baseband parameter and/or the second transmission time interval is or are equal to the first baseband parameter and/or the first second transmission time interval for the HARQ process number during initial transmission; or the terminal determines the second baseband parameter and/or the second transmission time interval according to a second baseband parameter and/or a second transmission time interval corresponding to an HARQ process number carried in the retransmission scheduling signaling; or the terminal determines the second transmission time interval according to a second transmission time interval corresponding to a second transmission time interval corresponding to an HARQ process number carried in the retransmission scheduling signaling, and determines the second baseband parameter according to resource indication information carried in the retransmission scheduling signaling, and resource-baseband parameter mapping information.

In a particular implementation, if the retransmission scheduling signaling only carries an HARQ process number, then the second baseband parameter and/or the second transmission time interval for retransmission will be the same as the first baseband parameter and/or the first transmission time interval for initial transmission, and at this time, the terminal will determine the HARQ process number, and the first baseband parameter and/or the first transmission time interval corresponding to the HARQ process number according to the retransmission scheduling signaling.

In a particular implementation, if the retransmission scheduling signaling carries an HARQ process number, and a second baseband parameter and/or a second transmission time interval corresponding to the HARQ process number, then the terminal may determine the second baseband parameter and/or the second transmission time interval corresponding to the HARQ process number according to the second baseband parameter and/or the second transmission time interval corresponding to the HARQ process number.

In the embodiment of the invention, if the retransmission scheduling signaling carries only a second transmission time interval corresponding to an HARQ process number, the terminal will determine the second transmission time interval according to the second transmission time interval corresponding to the HARQ process number, and then determine the second baseband parameter according to resource indication information carried in the retransmission scheduling signaling, and resource-baseband parameter mapping information.

Those ordinarily skilled in the art can select one of the three implementations above as needed in reality, although the embodiment of the invention will not be limited thereto.

It shall be noted that the numerology (i.e., baseband parameter) in the embodiment of the invention can be replaced with a Band Width Part (BWP), and a particular solution thereof will be substantially the same as the numerology, so a repeated description thereof will be omitted here.

Figure 2:
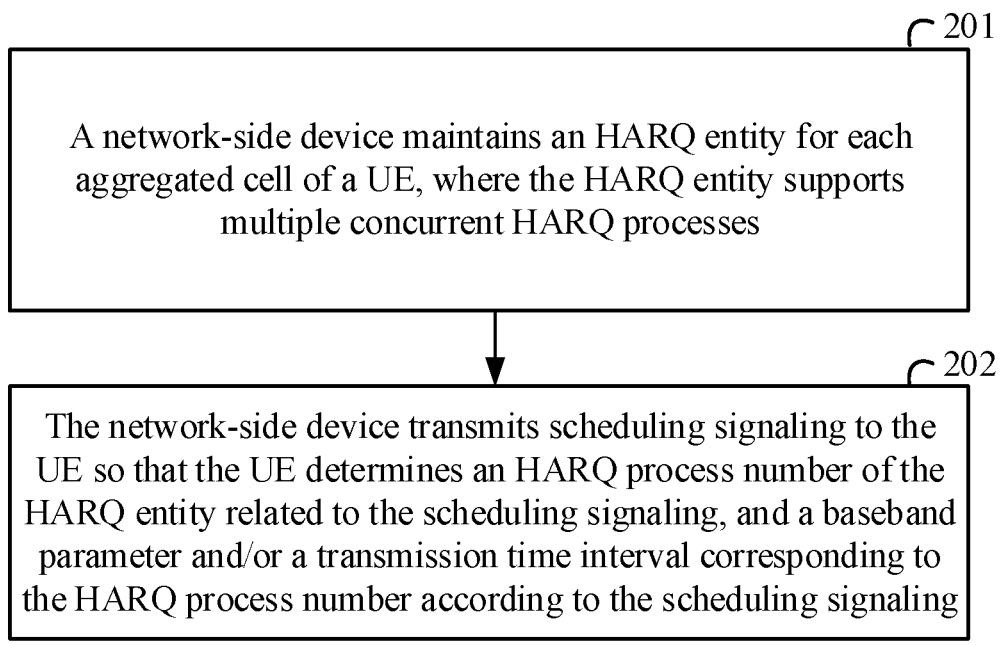
FIG. 2 is a schematic flow chart of a method for transmitting a Hybrid Automatic Repeat Request (HARQ) according to an embodiment of the invention.

Based upon the same inventive idea, as illustrated in FIG. 2, a method for transmitting a Hybrid Automatic Repeat Request (HARQ) according to an embodiment of the invention includes the following steps:

in the step 201, a network-side device maintains an HARQ entity for each aggregated cell of a terminal, where the HARQ entity supports multiple concurrent HARQ processes; and in the step 202, the network-side device transmits scheduling signaling to the terminal so that the terminal determines an HARQ process number of the HARQ entity related to the scheduling signaling, and a baseband parameter and/or a transmission time interval corresponding to the HARQ process number according to the scheduling signaling.

The method for transmitting a Hybrid Automatic Repeat Request (HARQ) according to the embodiment of the invention can be either a method for transmitting an HARQ, or a method for transmitting a downlink HARQ, although the embodiment of the invention will not be limited thereto. In the following description, an uplink HARQ will be transmitted, for example.

In the embodiment of the invention, the step 201 is firstly performed so that the network-side device maintains an HARQ entity for each aggregated cell of the terminal, where the HARQ entity supports multiple concurrent HARQ processes.

In a particular implementation, the network-side device maintains an HARQ entity for each aggregated cell of the terminal, where the HARQ entity supports multiple concurrent HARQ processes, there may or may not be the same baseband parameter and/or TTI corresponding to each of the multiple concurrent HARQ processes, and there may or may not be the same baseband parameter and/or TTI corresponding to initial transmission and retransmission of the same HARQ process.

In the embodiment of the invention, after the network-side device transmits the scheduling signaling to the terminal, the method further includes:

the network-side device determines HARQ configuration information corresponding to the terminal; and the network-side device transmits the HARQ configuration information to the terminal.

Furthermore, the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

In the embodiment of the invention, the maximum number of times that an uplink or downlink HARQ is transmitted represents the maximum number of times that data corresponding to the HARQ process are transmitted, and retransmission of the data is aborted after the maximum number of times that an uplink or downlink HARQ is transmitted is exceeded.

In the embodiment of the invention, the scheduling timing relationship includes an interval of time between a reception instance of time of the scheduling signaling transmitted by the network side, and a transmission instance of time of corresponding data.

The HARQ timing relationship includes an interval of time between the data transmission time, and HARQ feedback corresponding to the data.

The Discrete Reception (DRX) timer related configuration information includes but will not be limited to an HARQ Round Trip Time (RTT) timer, a drx-inactivity timer, and a drx-retransmission timer.

In the embodiment of the invention, the network-side device can determine the HARQ configuration information corresponding to the terminal in the following two implementations as described below respectively without any limitation thereto.

The network-side device configures each aggregated cell with a set of HARQ configuration information; or the network-side device configures a set of HARQ configuration information for each baseband parameter and/or transmission time interval.

In a particular implementation, the network-side device can configure each aggregated cell with a set of HARQ configuration information.

The network-side device can alternatively configure a set of HARQ configuration information for each baseband parameter and/or transmission time interval, and in this implementation, HARQ configuration information corresponding to either initial transmission or retransmission is determined according to the baseband parameter and/or the TTI corresponding to the process, as described below respectively.

In the embodiment of the invention, the network-side device configures a set of HARQ configuration information for each baseband parameter and/or transmission time interval as follows:

if there are different baseband parameter and/or transmission time intervals for initial transmission and retransmission, the network-side device will determine the maximum number of times that an uplink and/or downlink HARQ is transmitted, according to a first baseband parameter and/or a first transmission time interval corresponding to the initial transmission; or the network-side device will determine the maximum number of times that an uplink and/or downlink HARQ is transmitted, according to a second baseband parameter and/or a second transmission time interval corresponding to the retransmission.

In a particular implementation, if there is the same numerology and/or TTI for initial transmission and retransmission, then the network-side device will determine the maximum number of times that an uplink and/or downlink HARQ is transmitted, according to a first numerology and/or a first transmission time interval during initial transmission.

If there are different baseband parameter and/or transmission time intervals for initial transmission and retransmission, the network-side device will determine the maximum number of times that an uplink and/or downlink HARQ is transmitted, according to a first baseband parameter and/or a first transmission time interval for initial transmission, or determine the maximum number of times that an uplink and/or downlink HARQ is transmitted, according to a second baseband parameter and/or a second transmission time interval for retransmission.

In a particular implementation, when there are different baseband parameter and/or transmission time intervals for initial transmission and retransmission, one of the two implementations above can be selected particularly in the following steps:

the network-side device obtains a protocol agreement or a network-side configuration; and the network-side device determines according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a particular implementation, the network-side device obtains the protocol agreement or the network-side configuration, and determines according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In the embodiment of the invention, after the network-side device transmits the HARQ configuration information corresponding to the terminal to the terminal, the flow proceeds to the step 202 so that the network-side device transmits the scheduling signaling to the terminal so that the terminal determines the HARQ process number of the HARQ entity related to the scheduling signaling, and the baseband parameter and/or the transmission time interval corresponding to the HARQ process number according to the scheduling signaling.

When the network-side device transmits the scheduling signaling to the terminal, the network-side device can determine an HARQ process to be called in the HARQ entity, and the first baseband parameter and/or the first transmission time interval corresponding to the HARQ process number according to attribute information of the terminal, e.g., any one or combination of the speed of the terminal, frequency information corresponding to the terminal, and a type of service of the terminal, or other attribute parameters, although the embodiment of the invention will not be limited thereto.

In a particular implementation, a numerology for a terminal at a high speed is different from a numerology for a terminal at a low speed; a numerology at a high frequency is also different from a numerology at a low frequency; and numerologies for different services, e.g. Ultra Reliable and Low Latency Communication and enhanced Mobile Broadband communication, although examples thereof will not be enumerated here.

In the embodiment of the invention, the scheduling signaling transmitted by the network-side device to the terminal can be initial transmission scheduling signaling or retransmission scheduling signaling as described below respectively.

Initial transmission scheduling signaling.

The network-side device transmits initial transmission scheduling signaling to the terminal;

where the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a particular implementation, the a first transmission time interval corresponding to an HARQ process number includes but will not be limited to the following two implementations:

(1) The initial transmission scheduling signaling carries a first baseband parameter and/or a first transmission time interval corresponding to an HARQ process number so that the terminal determines the first baseband parameter and/or the first transmission time interval of the HARQ process number related to the initial transmission scheduling signaling according to the initial transmission scheduling signaling.

(2) The initial transmission scheduling signaling carries a first transmission time interval corresponding to an HARQ process number, and scheduled resource indication information.

In a second implementation, the method further includes:

the network-side device transmits resource-baseband parameter mapping information to the terminal so that the terminal determines the second baseband parameter according to the resource indication information and the resource-baseband parameter mapping information.

In a particular implementation, the initial transmission scheduling signaling carries a first transmission time interval corresponding to an HARQ process number so that the terminal determines the first transmission time interval corresponding to the HARQ process number according to the initial transmission scheduling signaling; and the network-side device also transmits the resource-baseband parameter mapping information to the terminal so that the terminal determines the first baseband parameter corresponding to the HARQ process number according to the resource indication information in the initial transmission scheduling signaling, and the resource-baseband parameter mapping information.

Retransmission scheduling signaling.

The network-side device transmits retransmission scheduling signaling to the terminal;

where the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In the embodiment of the invention, the network-side device transmits the retransmission scheduling signaling to the terminal particularly in the following steps:

the network-side device determines whether the number of times that an HARQ is transmitted reaches the maximum number of times that an uplink or downlink HARQ is transmitted; and if not, the network-side device will transmit the retransmission scheduling signaling to the terminal.

In the embodiment of the invention, when the network-side device configures each aggregated cell of the terminal with a set of HARQ configuration information, the network-side device determines the maximum number of times that an uplink or downlink HARQ is transmitted, directly according to the HARQ configuration information; and if the network-side device configures HARQ configuration information for each baseband parameter and/or transmission time interval, the network-side device will determine the maximum number of times that an uplink or downlink HARQ is transmitted corresponding to the second baseband parameter and/or the second transmission time interval for retransmission according to the HARQ configuration information, and then determine whether the number of times that an HARQ is transmitted reaches the maximum number of times that an uplink or downlink HARQ is transmitted, and if not, the network-side device will transmit the retransmission scheduling signaling to the terminal.

In the embodiment of the invention, the retransmission scheduling signaling includes but will not be limited to the following three implementations:

(1) The retransmission scheduling signaling carries an HARQ process number, but does not carry a second baseband parameter and/or a second transmission time interval corresponding to the HARQ process number.

In this implementation, the second baseband parameter and/or the second transmission time interval for retransmission is or are the same as the first baseband parameter and/or the first transmission time interval for initial transmission, so the retransmission scheduling signaling carries only the HARQ process number so that the terminal determines the HARQ process number corresponding to the retransmission scheduling signaling, and the second baseband parameter and/or the second transmission time interval corresponding to the HARQ process number according to the retransmission scheduling signaling.

(2) The retransmission scheduling signaling carries an HARQ process number, and a second baseband parameter and/or a second transmission time interval corresponding to the HARQ process number.

In this implementation, the second baseband parameter and/or the second transmission time interval for retransmission is or are different from the first baseband parameter and/or the first transmission time interval for initial transmission, so the retransmission scheduling signaling shall carry the second numerology and/or the second transmission time interval corresponding to the HARQ process number so that the terminal determines the HARQ process number related to the retransmission scheduling signaling, and the second baseband parameter and/or the second transmission time interval corresponding to the HARQ process number according to the retransmission scheduling signaling.

(3) The retransmission scheduling signaling carries a second transmission time interval corresponding to an HARQ process number, and scheduled resource indication information.

In this implementation, the method further includes:

the network-side device transmits resource-baseband parameter mapping information to the terminal so that the terminal determines the second baseband parameter according to the resource indication information and the resource-baseband parameter mapping information.

In a particular implementation, the retransmission scheduling signaling carries a second transmission interval corresponding to an HARQ process number so that the terminal determines the second transmission interval corresponding to the HARQ process number according to the retransmission scheduling signaling; and the network-side device also transmits the resource-baseband parameter mapping information to the terminal so that the terminal determines the second baseband parameter corresponding to the HARQ process number according to the resource indication information in the retransmission scheduling signaling, and the resource-baseband parameter mapping information.

Figure 3:
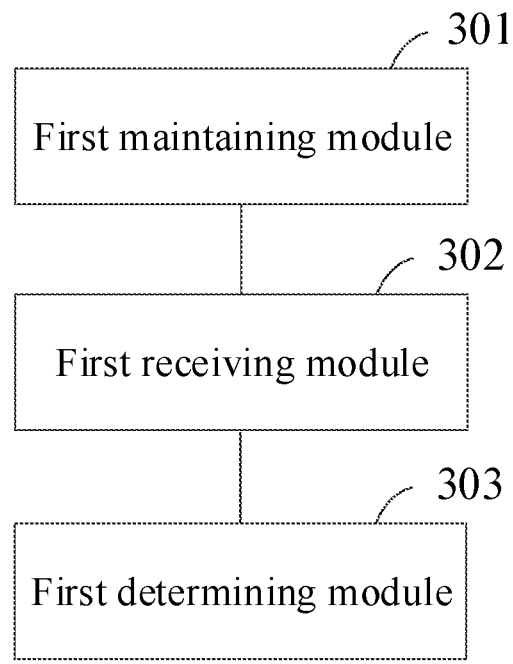
FIG. 3 is a schematic structural diagram of a terminal according to an embodiment of the invention.

Based upon the same inventive idea, an embodiment of the invention further provides a terminal, and reference can be made to the description of the corresponding method embodiment above, so a repeated description thereof will be omitted here; and as illustrated in FIG. 3, the terminal generally includes:

a first maintaining module 301 is configured to maintain an HARQ entity on the basis of cell, where the HARQ entity supports multiple concurrent HARQ processes;

a first receiving module 302 is configured to receive scheduling signaling transmitted by a network-side device; and a first determining module 303 is configured to determine an HARQ process number of the HARQ entity related to the scheduling signaling, and a baseband parameter and/or a transmission time interval corresponding to the HARQ process number according to the scheduling signaling.

In a possible implementation, the first receiving module 302 is configured:

to receive initial transmission scheduling signaling transmitted by the network-side device.

The first determining module 303 is configured:

to determine an HARQ process number of the HARQ entity related to the initial transmission scheduling signaling, and a first baseband parameter and/or a first transmission time interval corresponding to the HARQ process number according to the initial transmission scheduling signaling.

In a possible implementation, the first determining module 303 is configured:

to determine the first baseband parameter and/or the first transmission time interval according to a first baseband parameter and/or a first transmission time interval corresponding to an HARQ process number carried in the initial transmission scheduling signaling; or to determine the first transmission time interval according to a first transmission time interval corresponding to an HARQ process number carried in the initial transmission scheduling signaling, and to determine the first baseband parameter according to resource indication information carried in the initial transmission scheduling signaling, and resource-baseband parameter mapping information.

In a possible implementation, the first receiving module 302 is configured:

to receive retransmission scheduling signaling transmitted by the network-side device; and The first determining module 303 is configured:

to determine an HARQ process number of the HARQ entity related to the retransmission scheduling signaling, and a second baseband parameter and/or a second transmission time interval corresponding to the HARQ process number according to the retransmission scheduling signaling.

In a possible implementation, the first determining module 303 is configured:

to determine an HARQ process number according to the retransmission scheduling signaling, where the second baseband parameter and/or the second transmission time interval is or are equal to the first baseband parameter and/or the second transmission time interval for the HARQ process number during initial transmission; or to determine the second baseband parameter and/or the second transmission time interval according to a second baseband parameter and/or a second transmission time interval corresponding to an HARQ process number carried in the retransmission scheduling signaling; or to determine the second transmission time interval according to a second transmission time interval corresponding to an HARQ process number carried in the retransmission scheduling signaling, and to determine the second baseband parameter according to resource indication information carried in the retransmission scheduling signaling, and resource-baseband parameter mapping information.

In a possible implementation, the terminal further includes:

a second receiving module configured to receive HARQ configuration information, transmitted by the network-side device, corresponding to the terminal;

where the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

In a possible implementation, the HARQ configuration information includes a set of parameters configured by the network-side device for each terminal; or the HARQ configuration information includes a set of parameters configured by the network-side device for each baseband parameter and/or transmission time interval.

In a possible implementation, if there are different baseband parameter and/or transmission time intervals for initial transmission and retransmission, then:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a possible implementation, if there are different baseband parameter and/or transmission time intervals for initial transmission and retransmission, the network-side device will determine as agreed on in a protocol or as set by the network side whether the maximum number of times that an uplink and/or downlink HARQ is transmitted is determined according to a first baseband parameter and/or a first transmission time interval corresponding to the initial transmission, or a second baseband parameter and/or a second transmission time interval corresponding to the retransmission.

Figure 4:
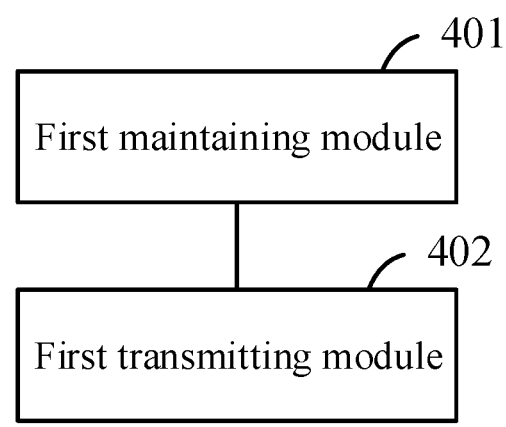
FIG. 4 is a schematic structural diagram of a network-side device according to an embodiment of the invention.

Based upon the same inventive idea, an embodiment of the invention further provides a network-side device, and reference can be made to the description of the corresponding method embodiment above, so a repeated description thereof will be omitted here; and as illustrated in FIG. 4, the network-side device generally includes:

a first maintaining module 401 is configured to maintain an HARQ entity for each aggregated cell of a terminal, where the HARQ entity supports multiple concurrent HARQ processes; and a first transmitting module 402 is configured to transmit scheduling signaling to the terminal so that the terminal determines an HARQ process number of the HARQ entity related to the scheduling signaling, and a baseband parameter and/or a transmission time interval corresponding to the HARQ process number according to the scheduling signaling.

In a possible implementation, the network-side device further includes:

a first determining module is configured to determine HARQ configuration information corresponding to the terminal; and a second transmitting module is configured to transmit the HARQ configuration information to the terminal.

In a possible implementation, the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

In a possible implementation, the first determining module is configured:

to configure each aggregated cell with a set of HARQ configuration information; or to configure a set of HARQ configuration information for each baseband parameter and/or transmission time interval.

In a possible implementation, the first determining module is configured:

if there are different numerologies and/or transmission time intervals for initial transmission and retransmission, to determine the maximum number of times that an uplink and/or downlink HARQ is transmitted, according to a first baseband parameter and/or a first transmission time interval corresponding to the initial transmission; or to determine the maximum number of times that an uplink and/or downlink HARQ is transmitted, according to a second baseband parameter and/or a second transmission time interval corresponding to the retransmission.

In a possible implementation, if there are different baseband parameter and/or transmission time intervals for initial transmission and retransmission, the first determining module is configured:

to obtain a protocol agreement or a network-side configuration; and to determine according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a possible implementation, the first transmitting module 402 is configured:

to transmit initial transmission scheduling signaling to the terminal;

where the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a possible implementation, the first transmitting module 402 is configured:

to transmit retransmission scheduling signaling to the terminal;

where the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In a possible implementation, the network-side device further includes:

a third transmitting module is configured to transmit resource-baseband parameter mapping information to the terminal so that the terminal determines the second baseband parameter according to the resource indication information and the resource-baseband parameter mapping information.

Figure 5:
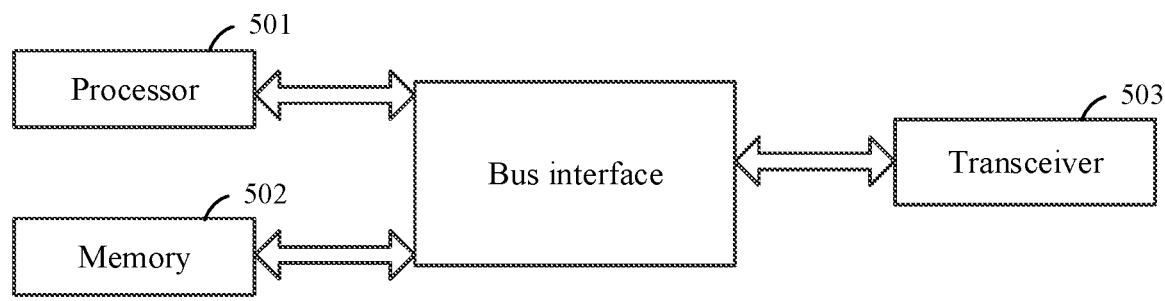
FIG. 5 is a schematic structural diagram of another terminal according to an embodiment of the invention.

Based upon the same inventive idea, an embodiment of the invention provides a terminal, and reference can be made to the description of the corresponding method embodiment above for a particular implementation of the terminal, so a repeated description thereof will be omitted here; and as illustrated in FIG. 5, the terminal generally includes a processor 501, a memory 502, and a transceiver 503, where the transceiver 503 transmits and receive data under the control of the processor 501, the memory 502 stores preset program, and the processor 501 reads and executes the program in the memory 502:

to maintain an HARQ entity on the basis of cell, where the HARQ entity supports multiple concurrent HARQ processes;

to receive scheduling signaling transmitted by a network-side device through the transceiver 503; and to determine an HARQ process number of the HARQ entity related to the scheduling signaling, and a baseband parameter and/or a transmission time interval corresponding to the HARQ process number according to the scheduling signaling.

In a possible implementation, the processor 501 is configured:

to receive initial transmission scheduling signaling transmitted by the network-side device through the transceiver 503; and to determine an HARQ process number of the HARQ entity related to the initial transmission scheduling signaling, and a first baseband parameter and/or a first transmission time interval corresponding to the HARQ process number according to the initial transmission scheduling signaling.

In a possible implementation, the processor 501 is configured:

to determine the first baseband parameter and/or the first transmission time interval according to a first baseband parameter and/or a first transmission time interval corresponding to an HARQ process number carried in the initial transmission scheduling signaling; or to determine the first transmission time interval according to a first transmission time interval corresponding to an HARQ process number carried in the initial transmission scheduling signaling, and to determine the first baseband parameter according to resource indication information carried in the initial transmission scheduling signaling, and resource-baseband parameter mapping information.

In a possible implementation, the processor 501 is configured:

to instruct the transceiver 503 to receive retransmission scheduling signaling transmitted by the network-side device; and to determine an HARQ process number of the HARQ entity related to the retransmission scheduling signaling, and a second baseband parameter and/or a second transmission time interval corresponding to the HARQ process number according to the retransmission scheduling signaling.

In a possible implementation, the processor 501 is configured:

to determine an HARQ process number according to the retransmission scheduling signaling, where the second baseband parameter and/or the second transmission time interval is or are equal to the first baseband parameter and/or the second transmission time interval for the HARQ process number during initial transmission; or to determine the second numerology and/or the second transmission time interval according to a second numerology and/or a second baseband parameter time interval corresponding to an HARQ process number carried in the retransmission scheduling signaling; or to determine the second transmission time interval according to a second transmission time interval corresponding to an HARQ process number carried in the retransmission scheduling signaling, and to determine the second baseband parameter according to resource indication information carried in the retransmission scheduling signaling, and resource-baseband parameter mapping information.

In a possible implementation, the processor 501 is further configured:

to instruct the transceiver 503 to receive HARQ configuration information, transmitted by the network-side device, corresponding to the terminal;

where the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

In a possible implementation, the HARQ configuration information includes a set of parameters configured by the network-side device for each terminal; or the HARQ configuration information includes a set of parameters configured by the network-side device for each baseband parameter and/or transmission time interval.

In a possible implementation, if there are different baseband parameter and/or transmission time intervals for initial transmission and retransmission, then:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission.

In a possible implementation, if there are different baseband parameter and/or transmission time intervals for initial transmission and retransmission, the network-side device will determine as agreed on in a protocol or as set by the network side whether the maximum number of times that an uplink and/or downlink HARQ is transmitted is determined according to a baseband parameter numerology and/or a first transmission time interval corresponding to the initial transmission, or a second baseband parameter and/or a second transmission time interval corresponding to the retransmission.

Figure 6:
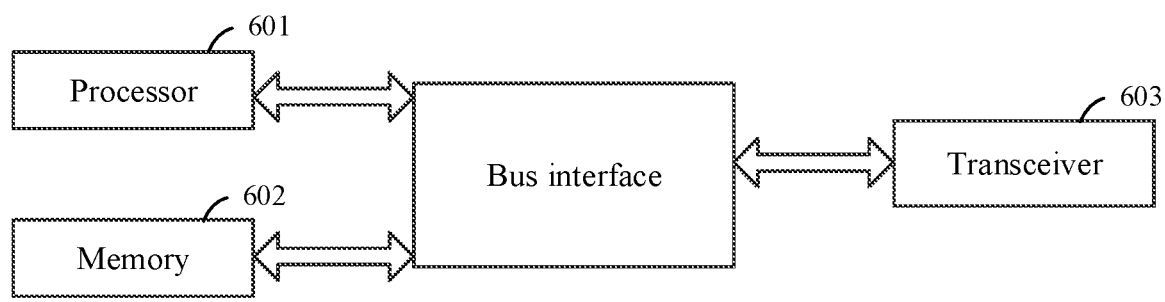
FIG. 6 is a schematic structural diagram of another network-side device according to an embodiment of the invention.

Based upon the same inventive idea, an embodiment of the invention provides a network-side device, and reference can be made to the description of the corresponding method embodiment above for a particular implementation of the network-side device, so a repeated description thereof will be omitted here; and as illustrated in FIG. 6, the network-side device generally includes a processor 601, a memory 602, and a transceiver 603, where the transceiver 603 transmits and receive data under the control of the processor 601, the memory 602 stores preset program, and the processor 601 reads and executes the program in the memory 602:

to maintain an HARQ entity on the basis of each aggregated cell of a terminal, where the HARQ entity supports multiple concurrent HARQ processes; and to transmit scheduling signaling to the terminal through the transceiver 603 so that the terminal determines an HARQ process number of the HARQ entity related to the scheduling signaling, and a baseband parameter and/or a transmission time interval corresponding to the HARQ process number according to the scheduling signaling.

In a possible implementation, the processor 601 is further configured:

to determine HARQ configuration information corresponding to the terminal; and to instruct the transceiver 603 to transmit the HARQ configuration information to the terminal.

In a possible implementation, the HARQ configuration information includes any one or more of:

the maximum number of times that an uplink or downlink HARQ is transmitted;

a scheduling timing relationship;

an HARQ timing relationship; and

Discrete Reception (DRX) timer related configuration information.

In a possible implementation, the processor 601 is configured:

to configure each aggregated cell with a set of HARQ configuration information; or to configure a set of HARQ configuration information for each baseband parameter and/or transmission time interval.

In a possible implementation, the processor 601 is configured:

If there are different baseband parameters and/or transmission time intervals for initial transmission and retransmission, to determine the maximum number of times that an uplink and/or downlink HARQ is transmitted, according to a first baseband parameter and/or a first transmission time interval corresponding to the initial transmission; or to determine the maximum number of times that an uplink and/or downlink HARQ is transmitted, according to a second baseband parameter and/or a second transmission time interval corresponding to the retransmission.

In a possible implementation, the processor 601 is configured:

to obtain a protocol agreement or a network-side configuration; and to determine according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

In a possible implementation, the processor 601 is configured:

to instruct the transceiver 603 to transmit initial transmission scheduling signaling to the terminal;

where the initial transmission scheduling signaling carries a first baseband parameter and/or a first transmission time interval corresponding to an HARQ process number; or the initial transmission scheduling signaling carries a first transmission time interval corresponding to an HARQ process number, and scheduled resource indication information.

In a possible implementation, the processor 601 is configured:

to instruct the transceiver 603 to transmit retransmission scheduling signaling to the terminal;

where the retransmission scheduling signaling carries an HARQ process number, but does not carry a second baseband parameter and/or a second transmission time interval corresponding to the HARQ process number; or the retransmission scheduling signaling carries an HARQ process number, and a second baseband parameter and/or a second transmission time interval corresponding to the HARQ process number; or the retransmission scheduling signaling carries a second transmission time interval corresponding to an HARQ process number, and scheduled resource indication information.

In a possible implementation, the processor 601 is further configured:

to instruct the transceiver 603 to transmit resource-baseband parameter mapping information to the terminal so that the terminal determines the second baseband parameter according to the resource indication information and the resource-baseband parameter mapping information.

An embodiment of the invention provides a readable storage medium which is a nonvolatile storage medium including program codes configured to cause a computing device to perform the method above in the network-side device, upon being executed on the computing device.

An embodiment of the invention provides a readable storage medium which is a nonvolatile storage medium including program codes configured to cause a computing device to perform the method above in the terminal, upon being executed on the computing device.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a Hybrid Automatic Repeat Request (HARQ), the method comprising:

maintaining, by a terminal, an HARQ entity on the basis of cell, wherein the HARQ entity supports multiple concurrent HARQ processes;

receiving, by the terminal, scheduling signaling transmitted by a network-side device; and determining, by the terminal, an HARQ process ID of the HARQ entity related to the scheduling signaling, and at least one of a baseband parameter corresponding to the HARQ process ID and a transmission time interval corresponding to the HARQ process ID according to the scheduling signaling;

wherein receiving, by the terminal, the scheduling signaling transmitted by the network- side device comprises:

receiving, by the terminal, initial transmission scheduling signaling transmitted by the network-side device, or receiving, by the terminal, retransmission scheduling signaling transmitted by the network-side device.

2. The method according to claim 1, further comprises:

receiving, by the terminal, HARQ configuration information, transmitted by the network-side device, corresponding to the terminal;

wherein the HARQ configuration information comprises at least one of followings:

a maximum number of times that an uplink or downlink HARQ is transmitted;

a scheduling timing relationship;

an HARQ timing relationship; or

Discrete Reception (DRX) timer related configuration information;

wherein the HARQ configuration information comprises a set of parameters configured by the network-side device for each terminal; or the HARQ configuration information comprises a set of parameters configured by the network-side device for each baseband parameter and/or transmission time interval;

wherein if there are different baseband parameters and/or transmission time intervals for initial transmission and retransmission:

the maximum number of times that an uplink and/or downlink HARQ is transmitted is a number of times determined according to a first baseband parameter and/or a first transmission time interval corresponding to the initial transmission; or the maximum number of times that an uplink and/or downlink HARQ is transmitted is a number of times determined according to a second baseband parameter and/or a second transmission time interval corresponding to the retransmission; or determining, by the network-side device, based on a protocol agreement or a network-side configuration whether the maximum number of times that an uplink and/or downlink HARQ is transmitted is determined according to a first baseband parameter and/or a first transmission time interval corresponding to the initial transmission, or according to a second baseband parameter and/or a second transmission time interval corresponding to the retransmission.

3. The method according to claim 1, wherein when receiving, by the terminal, initial transmission scheduling signaling transmitted by the network-side device, determining, by the terminal, the HARQ process ID of the HARQ entity related to the scheduling signaling, and at least one of the baseband parameter and the transmission time interval corresponding to the HARQ process ID according to the scheduling signaling comprises:

determining, by the terminal, an HARQ process ID of the HARQ entity related to the initial transmission scheduling signaling, and at least one of a first baseband parameter corresponding to the HARQ process ID and a first transmission time interval corresponding to the HARQ process ID according to the initial transmission scheduling signaling.

4. The method according to claim 3, wherein determining, by the terminal, the HARQ process ID of the HARQ entity related to the initial transmission scheduling signaling, and the first baseband parameter and/or the first transmission time interval corresponding to the HARQ process ID according to the initial transmission scheduling signaling comprises:

determining, by the terminal, the first baseband parameter and/or the first transmission time interval according to a first baseband parameter and/or a first transmission time interval corresponding to an HARQ process ID carried in the initial transmission scheduling signaling; or determining, by the terminal, the first transmission time interval according to a first transmission time interval corresponding to an HARQ process ID carried in the initial transmission scheduling signaling, and to determine the first baseband parameter according to resource indication information carried in the initial transmission scheduling signaling, and resource-baseband parameter mapping information.

5. The method according to claim 1, wherein when receiving, by the terminal, retransmission scheduling signaling transmitted by the network-side device, determining, by the terminal, the HARQ process ID of the HARQ entity related to the scheduling signaling, and at least one of the baseband parameter and the transmission time interval corresponding to the HARQ process ID according to the scheduling signaling comprises:

determining, by the terminal, an HARQ process ID of the HARQ entity related to the initial transmission scheduling signaling, and at least one of a second baseband parameter corresponding to the HARQ process ID and a second transmission time interval corresponding to the HARQ process ID according to the retransmission scheduling signaling.

6. The method according to claim 5, wherein determining, by the terminal, the HARQ process ID of the HARQ entity related to the retransmission scheduling signaling, and the second baseband parameter and/or a second transmission time interval corresponding to the HARQ process ID according to the retransmission scheduling signaling comprises:

determining, by the terminal, an HARQ process ID according to the retransmission scheduling signaling, wherein the second baseband parameter and/or the second transmission time interval is/are equal to the first baseband parameter and/or the second transmission time interval for the HARQ process ID during initial transmission; or determining, by the terminal, the second baseband parameter and/or the second transmission time interval according to a second baseband parameter and/or a second transmission time interval corresponding to an HARQ process ID carried in the retransmission scheduling signaling; or determining, by the terminal, the second transmission time interval according to a second transmission time interval corresponding to an HARQ process ID carried in the retransmission scheduling signaling, and to determine the second baseband parameter according to resource indication information carried in the retransmission scheduling signaling, and resource-baseband parameter mapping information.

7. A method for transmitting a Hybrid Automatic Repeat Request (HARQ), the method comprising:

maintaining, by a network-side device, an HARQ entity on the basis of each aggregated cell of a terminal, wherein the HARQ entity supports multiple concurrent HARQ processes; and transmitting, by the network-side device, scheduling signaling to the terminal so that the terminal determines an HARQ process ID of the HARQ entity related to the scheduling signaling, and at least one of a baseband parameter corresponding to the HARQ process ID and a transmission time interval corresponding to the HARQ process ID according to the scheduling signaling;

wherein transmitting, by the network-side device, the scheduling signaling to the terminal comprises:

transmitting, by the network-side device, initial transmission scheduling signaling to the terminal.

8. The method according to claim 7, further comprises:

determining, by the network-side device, HARQ configuration information corresponding to the terminal; and transmitting, by the network-side device, the HARQ configuration information to the terminal;

wherein the HARQ configuration information comprises at least one of followings:

a maximum number of times that an uplink or downlink HARQ is transmitted;

a scheduling timing relationship;

an HARQ timing relationship; or

Discrete Reception (DRX) timer related configuration information;

wherein determining, by the network-side device, the HARQ configuration information corresponding to the terminal comprises:

configuring, by the network-side device, each aggregated cell with a set of HARQ configuration information; or configuring, by the network-side device, a set of HARQ configuration information on the basis of each baseband parameter and/or transmission time interval;

wherein configuring, by the network-side device, a set of HARQ configuration information on the basis of each baseband parameter and/or transmission time interval comprises:

if there are different baseband parameters and/or transmission time intervals for initial transmission and retransmission, determining, by the network-side device, the maximum number of times that an uplink and/or downlink HARQ is transmitted, according to a first baseband parameter and/or a first transmission time interval corresponding to the initial transmission; or determining, by the network-side device, the maximum number of times that an uplink and/or downlink HARQ is transmitted, according to a second baseband parameter and/or a second transmission time interval corresponding to the retransmission; or wherein if there are different baseband parameters and/or transmission time intervals for initial transmission and retransmission, configuring, by the network-side device, a set of HARQ configuration information on the basis of each baseband parameter and/or transmission time interval comprises:

obtaining, by the network-side device, a protocol agreement or a network-side configuration; and determining, by the network-side device, according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

9. The method according to claim 7,
wherein the initial transmission scheduling signaling carries a first baseband parameter and/or a first transmission time interval corresponding to an HARQ process ID; or
the initial transmission scheduling signaling carries a first transmission time interval corresponding to an HARQ process ID, and scheduled resource indication information.

10. The method according to claim 9, further comprises:
transmitting, by the network-side device, to resource-baseband parameter mapping information to the terminal so that the terminal determines the second baseband parameter according to the resource indication information and the resource-baseband parameter mapping information.

11. The method according to claim 7,
wherein the retransmission scheduling signaling carries an HARQ process ID, but does not carry a second baseband parameter and/or a second transmission time interval corresponding to the HARQ process ID; or
the retransmission scheduling signaling carries an HARQ process ID, and a second baseband parameter and/or a second transmission time interval corresponding to the HARQ process ID; or
the retransmission scheduling signaling carries a second transmission time interval corresponding to an HARQ process ID, and scheduled resource indication information.

12. A terminal, comprising: a processor, a memory, and a transceiver, wherein:
the transceiver transmits and receives data under a control of the processor, the memory stores a preset program, and the processor reads and executes the program in the memory:
to maintain an HARQ entity on the basis of cell, wherein the HARQ entity supports multiple concurrent HARQ processes;
to receive initial transmission scheduling signaling transmitted by a network-side device through the transceiver or to receive retransmission scheduling signaling transmitted by the network-side device through the transceiver; and
to determine an HARQ process ID of the HARQ entity related to the scheduling signaling, and at least one of a baseband parameter corresponding to the HARQ process ID and a transmission time interval corresponding to the HARQ process ID according to the scheduling signaling.

13. The terminal according to claim 12, wherein the processor is configured to read and execute the program in the memory:

to instruct the transceiver to receive HARQ configuration information, transmitted by the network-side device, corresponding to the terminal;
wherein the HARQ configuration information comprises at least one of followings:
a maximum number of times that an uplink or downlink HARQ is transmitted;
a scheduling timing relationship;
an HARQ timing relationship; or
Discrete Reception (DRX) timer related configuration information;
wherein the HARQ configuration information comprises a set of parameters configured by the network-side device on the basis of each terminal; or
the HARQ configuration information comprises a set of parameters configured by the network-side device on the basis of each baseband parameter and/or transmission time interval
wherein if there are different baseband parameters and/or transmission time intervals for initial transmission and retransmission:
the maximum number of times that an uplink and/or downlink HARQ is transmitted is a number of times determined according to a first baseband parameter and/or a first transmission time interval corresponding to the initial transmission; or
the maximum number of times that an uplink and/or downlink HARQ is transmitted is a number of times determined according to a second baseband parameter and/or a second transmission time interval corresponding to the retransmission;
wherein if there are different baseband parameters and/or transmission time intervals for initial transmission and retransmission, whether the maximum number of times that an uplink and/or downlink HARQ is transmitted is determined according to a first baseband parameter and/or a first transmission time interval corresponding to the initial transmission, or according to a second baseband parameter and/or a second transmission time interval corresponding to the retransmission, is determined according to a protocol agreement or a network-side configuration.

14. The terminal according to claim 12, wherein the processor is configured to read and execute the program in the memory:
when receiving initial transmission scheduling signaling transmitted by the network-side device through the transceiver,
to determine an HARQ process ID of the HARQ entity related to the initial transmission scheduling signaling, and at least one of a first baseband parameter corresponding to the HARQ process ID and a first transmission time interval corresponding to the HARQ process ID according to the initial transmission scheduling signaling.

15. The terminal according to claim 14, wherein the processor is configured to read and execute the program in the memory:
to determine the first baseband parameter and/or the first transmission time interval according to a first baseband parameter and/or a first transmission time interval corresponding to an HARQ process ID carried in the initial transmission scheduling signaling; or
to determine the first transmission time interval according to a first transmission time interval corresponding to an HARQ process ID carried in the initial transmission scheduling signaling, and to determine the first baseband parameter according to resource indication information carried in the initial transmission scheduling signaling, and resource-baseband parameter mapping information.

16. The terminal according to claim 12, wherein the processor is configured to read and execute the program in the memory:
when receiving retransmission scheduling signaling transmitted by the network-side device,
to determine an HARQ process ID of the HARQ entity related to the retransmission scheduling signaling, and at least one of a second baseband parameter corresponding to the HARQ process ID and a second transmission time interval corresponding to the HARQ process ID according to the retransmission scheduling signaling.

17. The terminal according to claim 16, wherein the processor is configured to read and execute the program in the memory:
to determine an HARQ process ID according to the retransmission scheduling signaling, wherein the second baseband parameter and/or the second transmission time interval is/are equal to the first baseband parameter and/or the second transmission time interval for the HARQ process ID during initial transmission; or
to determine the second baseband parameter and/or the second transmission time interval according to a second baseband parameter and/or a second transmission time interval corresponding to an HARQ process ID carried in the retransmission scheduling signaling; or
to determine the second transmission time interval according to a second transmission time interval corresponding to an HARQ process ID carried in the retransmission scheduling signaling, and to determine the second baseband parameter according to resource indication information carried in the retransmission scheduling signaling, and resource-baseband parameter mapping information.

18. A network-side device, comprising: a processor, a memory, and a transceiver, wherein:
the transceiver transmits and receive data under the control of the processor, the memory stores preset program, and the processor reads and executes the program in the memory:
to maintain an HARQ entity on the basis of each aggregated cell of a terminal, wherein the HARQ entity supports multiple concurrent HARQ processes; and
to transmit initial transmission scheduling signaling or retransmission scheduling signaling to the terminal through the transceiver so that the terminal determines an HARQ process ID of the HARQ entity related to the scheduling signaling, and at least one of a baseband parameter corresponding to the HARQ process ID and a transmission time interval corresponding to the HARQ process ID according to the scheduling signaling.

19. The network-side device according to claim 18, wherein the processor is further configured to read and execute the program in the memory:
to determine HARQ configuration information corresponding to the terminal; and
to instruct the transceiver to transmit the HARQ configuration information to the terminal;
wherein the HARQ configuration information comprises at least one of followings:
a maximum number of times that an uplink or downlink HARQ is transmitted;
a scheduling timing relationship;
an HARQ timing relationship; or
Discrete Reception (DRX) timer related configuration information;
wherein the processor is configured to read and execute the program in the memory:
to configure each aggregated cell with a set of HARQ configuration information; or
to configure a set of HARQ configuration information on the basis of each baseband parameter and/or transmission time interval;
wherein the processor is configured to read and execute the program in the memory:
if there are different baseband parameters and/or transmission time intervals for initial transmission and retransmission, to determine the maximum number of times that an uplink and/or downlink HARQ is transmitted, according to a first baseband parameter and/or a first transmission time interval corresponding to the initial transmission; or
to determine the maximum number of times that an uplink and/or downlink HARQ is transmitted, according to a second baseband parameter and/or a second transmission time interval corresponding to the retransmission;
wherein if there are different baseband parameters and/or transmission time intervals for initial transmission and retransmission, the processor is configured to read and execute the program in the memory:
to obtain a protocol agreement or a network-side configuration; and
to determine according to the protocol agreement or the network-side configuration whether the maximum number of times that an uplink and/or downlink HARQ is transmitted is determined according to the first baseband parameter and/or the first transmission time interval corresponding to the initial transmission, or the maximum number of times that an uplink and/or downlink HARQ is transmitted is determined according to the second baseband parameter and/or the second transmission time interval corresponding to the retransmission.

20. The network side device according to claim 18, wherein the initial transmission scheduling signaling carries a first baseband parameter corresponding to an HARQ process ID and/or a first transmission time interval corresponding to an HARQ process ID; or
the initial transmission scheduling signaling carries a first transmission time interval corresponding to an HARQ process ID, and scheduled resource indication information.

21. The network-side device according to claim 20, wherein the processor is further configured to read and execute the program in the memory:
to instruct the transceiver to transmit resource-baseband parameter mapping information to the terminal so that the terminal determines the second baseband parameter according to the resource indication information and the resource-baseband parameter mapping information.

22. The network side device according to claim 18, wherein the retransmission scheduling signaling carries an HARQ process ID, but does not carry a second baseband parameter and/or a second transmission time interval corresponding to the HARQ process ID; or
the retransmission scheduling signaling carries an HARQ process ID, and at least one of a second baseparameter corresponding to the HARQ process ID and a second transmission time interval corresponding to the HARQ process ID; or the retransmission scheduling signaling carries a second transmission time interval corresponding to an HARQ process ID, and scheduled resource indication information.

* * * * *